No. 717,883. PATENTED JAN. 6, 1903.
R. P. MATHEWS.
HAND GAINING TOOL.
APPLICATION FILED APR. 7, 1902.
NO MODEL.
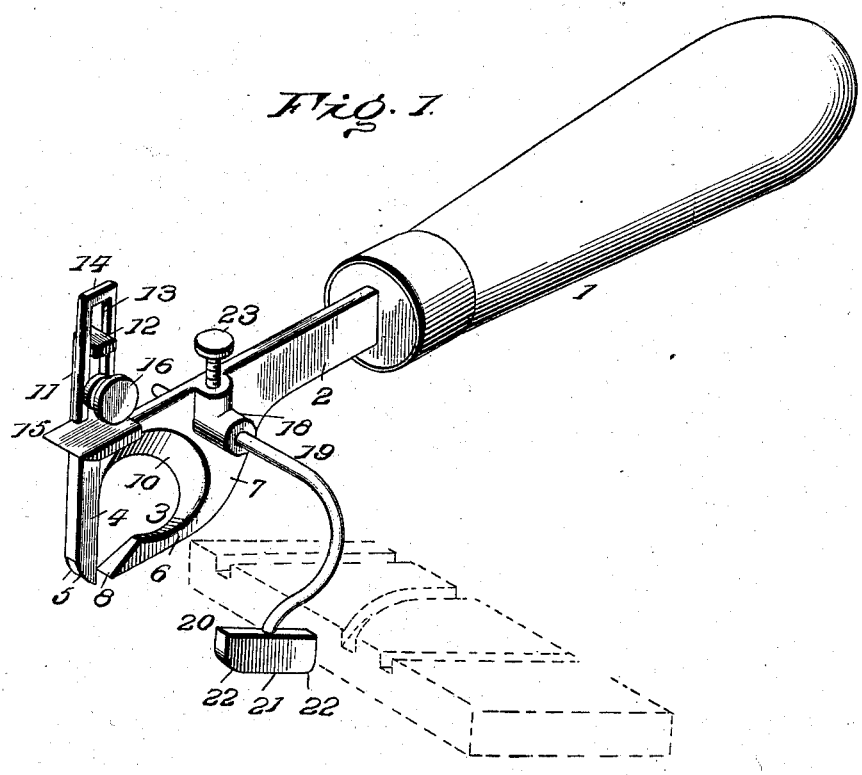
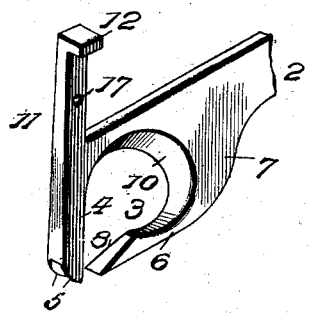
Witnesses
Inventor
Robert P. Mathers
By
R. S. & B. Lacey
Attorneys

UNITED STATES PATENT OFFICE.

ROBERT P. MATHEWS, OF HARVARD, ILLINOIS, ASSIGNOR OF TWO-THIRDS TO MARTIN A. STAFFORD AND HARRY E. STAFFORD, OF HARVARD, ILLINOIS.

HAND GAINING-TOOL.

SPECIFICATION forming part of Letters Patent No. 717,883, dated January 6, 1903.

Application filed April 7, 1902. Serial No. 101,835. (No model.)

*To all whom it may concern:*

Be it known that I, ROBERT P. MATHEWS, a citizen of the United States, residing at Harvard, in the county of McHenry and State of Illinois, have invented certain new and useful Improvements in Hand Gaining-Tools; and I do hereby declare the following to be a full, clear, and exact description of the invention, such as will enable others skilled in the art to which it appertains to make and use the same.

This invention relates to hand gaining-tools, the object in view being to provide a manually-operated implement adapted to cut a groove of any desired depth in lumber either in a rectilinear or curvilinear path. Incidental to the primary object of the invention the aim of the invention is to so form the cutting-bit as to locate the advance cutters and following chisel in close relation to each other, at the same time doing away entirely with any material or projection in advance of the cutters, in rear of the chisel, and between the cutters and chisel, thus enabling the tool to be advanced and to form a groove either in a straight, curved, or tortuous path.

Another object of the invention is to provide the bit of the implement with a clearance-throat the edge of which is beveled on one side, so as to discharge the shavings or cuttings laterally. In connection with the gaining-tool depth and side or lateral gages are employed, the same being made adjustable to give a wide range.

With the above and other objects in view, the nature of which will more fully appear as the description proceeds, the invention consists in the novel construction, combination, and arrangement of parts, as hereinafter, fully described, illustrated, and claimed.

In the accompanying drawings, Figure 1 is a perspective view of a hand gaining implement constructed in accordance with the present invention, showing the work in dotted lines. Fig. 2 is a detail perspective view of the bit, guide-post, and a portion of the shank. Fig. 3 is a vertical section through that portion of the bit which carries the cutters.

Like reference numerals designate corresponding parts in all the figures.

The hand gaining-tool contemplated in this invention comprises, essentially, a handle 1, from which extends a shank 2, which terminates in a C-shaped bit 3. The bit, which is illustrated in detail in Fig. 2, is shown to comprise a vertical or pendent arm 4, which travels in advance of the rest of the tool and is provided at its lower edge with downwardly-projecting cutters 5, arranged at a distance apart equal to the width of the groove to be formed in the stock. In order to provide for the proper clearance, the lower portion of the arm 4 is thickened or expanded, as indicated in Fig. 3, the outer surfaces of the cutters 5 being in line with the opposite surfaces of the arm 4, while the inner sides of the cutters are beveled to diverge downwardly, as shown. A horizontal arm 6 is connected with the body of the bit and the shank 2 by means of a curved portion 7, and said arm terminates in a chisel-shaped cutting-point 8, which is located in close proximity to the cutters 5, so as to follow directly thereafter and remove the material between the cuts formed by the cutters 5. The horizontal arm 6 is, like the vertical arm 4, widest at the bottom, so as to give the proper clearance and facilitate the operation of the tool. A large opening or throat 9 intervenes between the arms 4 and 6 of the bit to allow the shavings or cuttings to rise, and the edge of said opening is beveled or chamfered at one side, as shown at 10, for the purpose of discharging the shavings or cuttings laterally as it is advanced along the work. Extending upward from the bit is an upright guide-post 11, provided at the top with a laterally-projecting guide-lug 12, which is received in the slot 13 of the shank 14 of a depth-gage 15. This gage is adjustable up and down on the guide-post 11 and vertical arm 4 and is held at any desired adjustment by means of a set-screw 16, the shank of which passes through the slot 13 of the depth-gage and enters a threaded opening 17 in the guide-post. By adjusting the gage 15 any desired depth of cut may be obtained, the tool being operated until the gage 15 moves in contact with the adjacent surface of the work.

At one side the cutting bit or shank is provided with an L-shaped lug 18, which, together with the shank or bit, is provided with a lateral opening, through which passes a stem 19 of a side gage 20, having a plane lower edge 21 and rounded or beveled lower corners 22 to facilitate the movement of said gage through a groove previously formed by the gaining-tool. The stem 19 is adjustable through the opening in the lug 18 and may be held fixedly at any point of adjustment by means of a binding-screw 23, threaded through the upper portion of the lug 18 and adapted to be brought to bear against the stem 19. By means of the side gage and its adjustment the distance between adjacent grooves may be readily gaged.

From the foregoing description it will be seen that no material is left in advance of the cutters 5, nor in rear of the chisel 8, nor between the cutters and chisel, while at the same time the cutters and chisel are located in close relation to each other, which adapts the tool to be advanced in a curved or tortuous path as well as in a rectilinear path, thereby adding to the practical value and utility of the device. The depth and side gages are both easily adjustable, and thereby the depth of cut and the distance between the adjacent groove may be readily and accurately determined.

The hand gaining-tool hereinabove described may be made in various sizes for cutting grooves of different depth and width, and other changes may be made in the form, proportion, and minor details of construction without departing from the principle of the present invention.

Having thus described the invention, what is claimed as new, and desired to be secured by Letters Patent, is—

1. A hand gaining-tool comprising a shank terminating in a bit of approximately C form, one arm of the bit being about at a right angle to the shank to occupy a perpendicular position when the said shank is horizontally arranged and terminating in spaced cutters, and the other arm curving away from, thence about parallel with the said shank toward the spaced cutters and terminating in a chisel-edge, substantially as described.

2. A hand gaining-tool comprising a shank terminating in a bit of approximately C form, one arm of the bit being about at a right angle to the shank to occupy a perpendicular position when the said shank is horizontally arranged and terminating in spaced cutters, and the other arm curving away from, thence about parallel with the said shank toward the spaced cutters and terminating in a chisel-edge, and a depth-gage adjustable on the vertical arm of the bit and in a direction at a right angle to the length of the aforesaid shank, substantially as specified.

3. In a hand gaining-tool, a shank, an arm and guide at the outer end of the shank extended in opposite directions therefrom about at a right angle, the arm terminating in spaced cutters, a second arm curved away from, thence about parallel with the shank toward the said spaced cutters and terminating in a chisel-edge, and a depth-gage adjustable on the said guide, substantially as set forth.

4. A hand gaining-tool comprising a handle, a cutting-bit connected therewith and embodying a chisel-point and oppositely-arranged cutters located in advance of the chisel-point, a guide-post extending upward from the bit, and a depth-gage adjustably mounted on said guide-post, substantially as described.

5. A hand gaining-tool comprising a handle, a cutting-bit connected therewith, a guide-post extending upwardly from the bit and provided at its upper end with a laterally-projecting guide-lug, and a depth-gage provided with a slotted shank embracing the guide-lug, and a set-screw passing through the slotted shank into the guide-post at a distance from the guide-lug, substantially as and for the purpose set forth.

In testimony whereof I affix my signature in presence of two witnesses.

ROBERT P. MATHEWS. [L. S.]

Witnesses:
EUGENE SAUNDERS,
M. J. EMERSON.